United States Patent

Charrue et al.

[11] Patent Number: 5,773,148
[45] Date of Patent: Jun. 30, 1998

[54] CHEMICALLY TOUGHENED PANE

[75] Inventors: Herve Charrue, Rueil-Malmaisson; Francoise Rifqi, Paris; Renee Crepet, Villepinte; Claude Guillemet, Bois Colombes, all of France

[73] Assignee: Saint Gobain Vitrage, Courbevoie, France

[21] Appl. No.: 454,190

[22] PCT Filed: Oct. 21, 1993

[86] PCT No.: PCT/FR93/01035

§ 371 Date: Sep. 29, 1995

§ 102(e) Date: Sep. 29, 1995

[87] PCT Pub. No.: WO94/08910

PCT Pub. Date: Apr. 28, 1994

[30] Foreign Application Priority Data

Oct. 22, 1992 [FR] France .................................. 92 12637

[51] Int. Cl.⁶ ...................................................... B32B 17/00
[52] U.S. Cl. ......................... 428/410; 428/426; 65/30.13; 65/30.14
[58] Field of Search ..................................... 428/410, 218, 428/426; 501/55, 65, 66; 65/30.13, 30.14

[56] References Cited

U.S. PATENT DOCUMENTS 4,053,679 10/1977 Rinehart .................................. 428/410
4,156,755 5/1979 Rinehart .................................. 428/410
4,671,814 6/1987 Aratani .................................... 428/410
5,084,328 1/1992 Fine ......................................... 428/410

Primary Examiner—Timothy M. Speer
Attorney, Agent, or Firm—Oblon, Spivak, McClelland, Maier & Neustadt, P.C.

[57] ABSTRACT

This invention has as its subject a panel, preferably produced by the float process, reinforced by surface ion exchange for a long period at a temperature such that the exchanged depth is greater than 250 microns for surface compressive stresses exceeding 400 MPa, and greater than 75 microns for surface compresive stresses exceeding 700 Mpa, and the matrix of which complies with one of the following compositions, expressed in percentages by weight:

$SiO_2$:65 to 76%
$Al_2O_3$:1.5 to 5%
MgO:4 to 8%
CaO:0 to 4.5%
$Na_2$:10 to 18%
$K_2O$:1 to 7.5%
$B_2O_3$:0 to 4% these elements representing at least 96% of the weight of the glass and complying, in addition, with the percentages by weight $0<CaO/CaO+MgO<0.45$ and $0.05<K_2O/Na_2O+K_2O<0.35$.

17 Claims, 2 Drawing Sheets

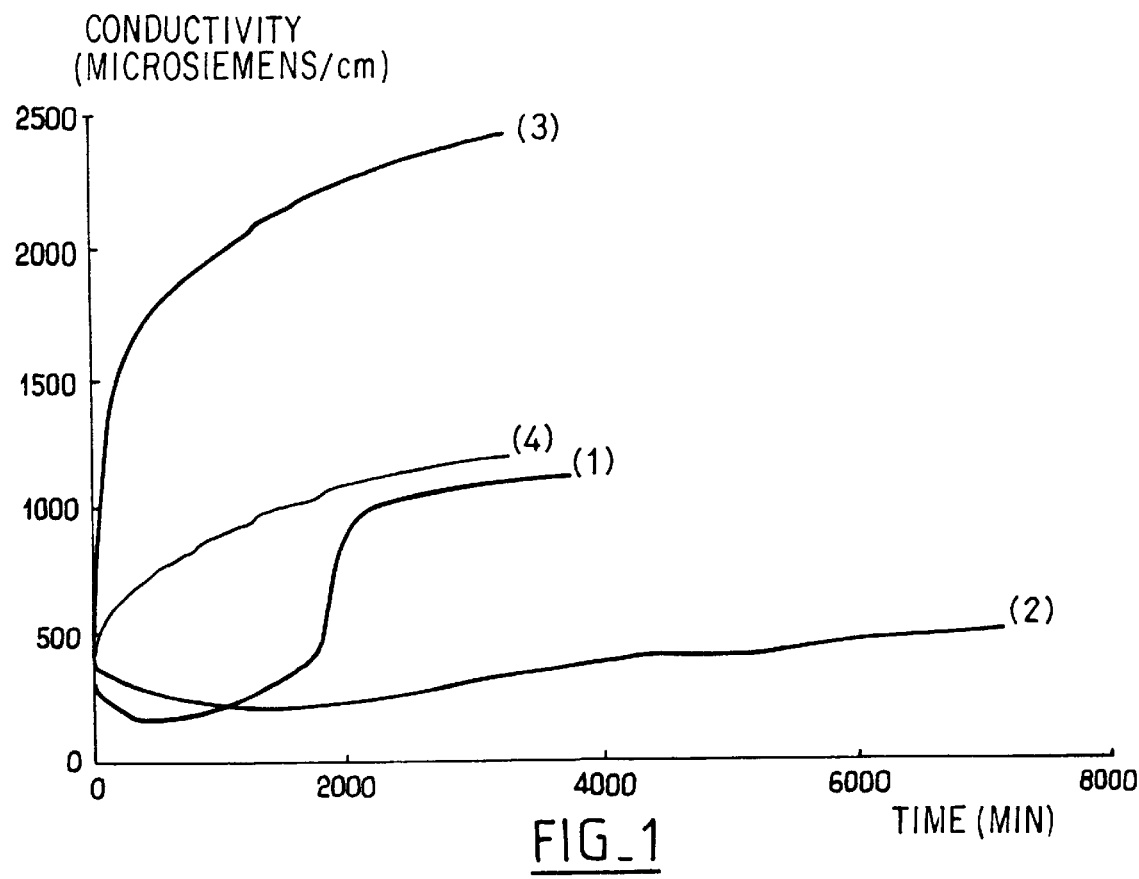
FIG_1
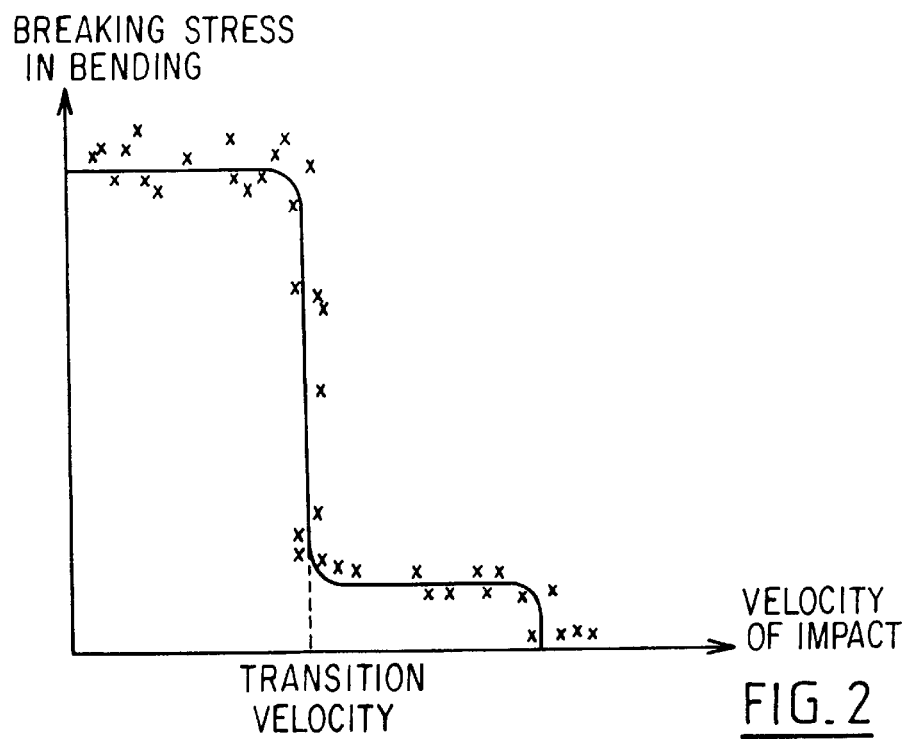
FIG_2

CHEMICALLY TOUGHENED PANE

BACKGROUND OF THE INVENTION

This invention relates to chemically toughened panes, that is to say panes in which the surface has been brought into compression by alkaline ion exchange. More specifically, the invention concerns panes having high compressive stresses over a large depth and intended, more especially, for aeronautical applications.

For aeronautical applications, notably panes for aeroplanes or helicopters, the demands regarding mechanical strength are such that usually an operation is carried out for strengthening by chemical means and not simply by thermal means as is usual, for example, for automobile panes. Chemical toughening may also be used for other highly demanding applications, such as panes for armoured vehicles, railway vehicles or ships.

As in the case of thermal toughening, chemical toughening consists of bringing the surface of the glass into compression, the breaking strength of the glass being increased by a value substantially identical to the intensity of the surface compressive stress generated by the treatment, in the present case generated by the replacement of a portion of the alkaline ions of the surface layers of the glass by other ions of larger size, which enter the vitreous network.

For loadings applied over the entirety of the pane, in the manner of the pressure applied by the air in a pressurized aircraft cockpit, the quality of the mechanical toughening is essentially dictated by the value of the surface compressive stress. Nevertheless, for more dynamic loadings, for example impact with a bird, the depth treated is also critical, because the impact creates a very high load which can cause breakage of the glass from a face subject to tensile stress and having surface defects. Ideally, the chemical toughening operation thus has as its objective to place the surface layers of the glass object treated under a very high compressive stress, to a depth which is very great and at least equal to that of the largest possible defect.

For a given glassmaking composition, the depth exchanged depends upon the duration of the ion exchange treatment and/or the temperature at which it in carried out. However, a rise in the temperature leads to an increase in the relaxation rate of the stresses and, consequently, to low levels of breakage stress. To prolong the treatment excessively likewise leads to an unsatisfactory degree of toughening, because the stresses then have the time required for relaxing.

SUMMARY OF THE INVENTION

These considerations have led to the development of new glassmaking compositions that are more favourable to ion exchanges than the glass compositions of conventional sheet glass, and make it possible, notably, to obtain greater depths of exchange for treatment durations that do not exceed a few hours. Thus, Patent Application FR-A-2 128 031 proposes silico-sodic glasses that make use of oxides commonly encountered in conventional industrial glasses, complying with the following composition, defined by its percentages by weight:

$SiO_2$: 65.0 to 76.0%

$Al_2O_3$: 1.5 to 5.0%

MgO: 4.0 to 8.0%

CaO: 0.0 to 4.5%

$Na_2O$: 10.0 to 18.0%

$K_2O$: 1.0 to 7.5%

$B_2O_3$: 0.0 to 4.0% these elements representing at least 96% of the weight of the glass and complying, furthermore, with the percentages by weight CaO/[CaO+MgO] lying between 0 and 0.45 and $K_2O$/[$Na_2O+K_2O$] lying between 0.05 and 0.35—these limits being inclusive.

The above defined compositions enable a depth of strengthening from 1.8 to 3.3 times greater than the depth achieved with ordinary sheet glass to be obtained after 24 hours.

Nevertheless, in Patent Application FR-A-2 128 031, the ion exchanges are relatively brief, systematically limited to durations of at most 24 hours, which enables a thickness of the strengthened layer of at most approximately 100 microns to be obtained (for a treatment temperature of 450° C.). Now for aeronautical applications, in particular, it is necessary for this thickness to be considerably greater and, for example, to be approximately 300 microns, which raises once again the problem recalled above for conventional glass compositions.

BRIEF DESCRIPTION OF THE DRAWINGS

FIG. 1 shows results of conductivity versus time tests of toughened glass according to the invention and comparative non-toughened glass.

FIG. 2 shows the typical form of a curve representing the value of the failure stress in bending as a function of the impact speed of an impact ball used to determine the resistance of a glass pane to flying chips.

Figure 3:
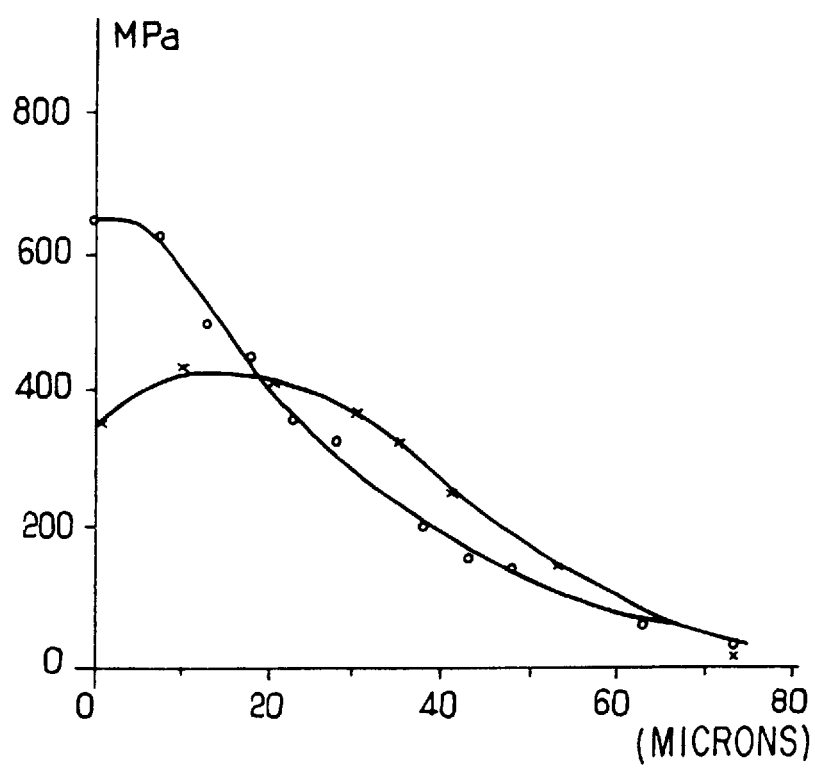
FIG. 3 and FIG. 4 show the profile of strengthening with depth for various glass panes.

DETAILED DESCRIPTION OF THE PREFERRED EMBODIMENTS.

Very surprisingly, the authors of the present invention have found that such a glassmaking composition is also suitable for long treatments, typically of at least 72 hours and notably of more than 10 days or even more than 15 days, it being possible for these treatment times to exceed, if desired, about 20 days, and for this reason such compositions may be used for the production of articles of glass strengthened by ion exchange to a great depth, for example of 200 microns or more, while still maintaining very satisfactory strengthening levels, for example with surface compressive stresses of at least 400 MPa. The invention thus has as its subject, notably, products of glass, the composition of which complies with the formula known from Patent FR 2 128 031, and which have been subjected to a strengthening treatment by ion exchange at a temperature such that the surface compressive stress is at least 400 MPa and preferably at least 500 MPat for a treated depth of at least 200 microns, or again articles, the surface compressive stress of which is at least 650 MPa for a treated depth of at least 75 microns.

As an indication, the treatment performed may be, for example, of 18 days at a temperature of 415° C., which leads to surface compressive stresses of approximately 500 MPa, and an exchanged depth of approximately 265 microns. If the application envisaged will accept lesser treatment depths, it is also possible to obtain substantially higher strengthening levels, with surface compressive stresses, for example, of approximately 700 MPa or higher, with treatments at low temperature (for example 350° C.) for periods of time substantially identical to the preceding case, now with a treatment depth of approximately 80 microns. Thus the long duration treatments make possible a whole range of new products, the strengthening levels of which are relatively high.

Another aspect of the products according to this invention is that of their method of production. In the already mentioned Patent Application, it is stated that the glasses complying-with the specific composition described may be produced, refined and shaped in the conventional installations for silico-sodo-calcic glasses. At the date of that Patent Application, this expression "conventional installations" did not apply to the installations known as "float", in which the glass is formed on a bath of molten tin. Now the float method is today the most commonly used on account of its economical nature and of the very high optical quality of the products.

For the person skilled in the art it is always difficult to modify, even slightly, a float glass composition, because such an installation represents considerable capital investment and is in practice beyond repair if the composition should, for example, cause accelerated wear of the refractories. Moreover, the float glass ribbon has, by its nature, asymmetric faces, one of its principal faces being in contact with the molten bath and the other with the atmosphere existing above the bath; in fact, the "tin" face is always more or less enriched by the tin which diffuses through the glass, the concentration of which decreases from this surface.

It was feared that this asymmetry of the faces might have extremely adverse effects upon the operation of strengthening by ion exchange and would lead to levels of surface compressive stress that would be different on the two principal faces of the glass ribbon with the consequence of defects in planeity of the pane.

Quite unexpectedly, it has been found that these problems do not arise or at least do not arise in such a way that they entirely inhibit production. On the one hand, the glass composition, in spite of a high content of volatile elements, such as boron, is compatible with the float process and, on the other hand, the tin and atmospheric faces cannot sensibly be distinguished after the chemical toughening operation.

The invention therefore also has as its principal subject a pane produced on a molten tin bath and then strengthened by surface ion exchange, the matrix of which complies with one of the following compositions, expressed in percentages by weight:

$SiO_2$:65.0 to 76.0%
$Al_2O_3$:1.5 to 5.0%
MgO:4.0 to 8.0%
CaO:0.0 to 4.5%
$Na_2O$:10.0 to 18.0%
$K_2O$:1.0 to 7.5%
$B_2O_3$:0.0 to 4.0% these elements representing at least 96% of the weight of the glass and complying, in addition, with the percentages by weight CaO/[CaO+MgO] lying between 0 and 0.45 and $K_2O/[Na_2O+K_2O]$ lying between 0.05 and 0.35 - these limits being inclusive.

A pane produced by the float process of the ribbon of glass floating on the molten tin bath can be easily distinguished from the panes obtained by other glassmaking processes, in particular by a tin oxide content, decreasing within the thickness, on the face initially in contact with the tin bath. The tin oxide content may be measured, for example, by electronic microprobe to a depth of the order of 10 microns. In the majority of cases, this content lies between 1 and 5%, integrated over the first 10 microns starting from the surface.

Another factor which could not have been presumed by the person skilled in the art, the relaxation of the compressive stresses which takes place for toughening treatments of several and indeed several tens of days, is not such that it leads to inadequate surface compressive stress levels. On the contrary, it is possible to produce panes which have, after toughening, compressive stress levels of at least 400 MPa, which is suitable for the demanding applications envisaged.

Among the compositions according to this invention, there will be adopted, more particularly, those that have a shaping range around 1,050°–1,150° C. (it will be remembered that for the float process the shaping range corresponds to the temperature range for which the viscosity of the glass expressed in poises lies between 1,585 (log$\eta$=3.2) and 5,000 (log$\eta$=3.7). The most preferred compositions are those that correspond to glasses having a very high hydrolytic resistance, preferably less than 20 if this resistance is expressed as a function of the loss of weight. It may, in fact, be noted that the panes according to this invention are intended for applications of an exceptional character, and that it is immediately desirable to be able to space the production runs, for example at every five years, while storing the non-toughened panes so as not to carry out the chemical toughening treatment until just before the assembling operation and the completion of the product (a windscreen, rear window pane etc.), while still of course maintaining a constant quality.

Other details and advantageous characteristics of the invention will be apparent from the comparison given below between panes according to a preferred form of embodiment of this invention and panes of usual silico-calcic "float" glass.

The glass matrices used comply with the following formulae (expressed in percentages by weight):

|  | Reference glass (A) | Glass acc. to this invention |
|---|---|---|
| $SiO_2$ | 71.7 | 66.66 |
| $AlO_3$ | 0.6 | 4.59 |
| MgO | 4 | 6.89 |
| CaO | 9.5 | — |
| $Na_2O$ | 13.6 | 12.20 |
| $K_2O$ | — | 6.16 |
| $B_2O_3$ | — | 3.44 |
| Various | 0.6 | 0.06 |
| log $\eta$ = 3.2 | 1,144° C. | 1,192° C. |
| log $\eta$ = 3.7 | 1,062° C. | 1,100° C. |

The last two lines correspond to the temperatures for which the viscosity of the material, expressed in poises, is such that their decimal logarithm is, respectively, 3.2 and 3.7, which corresponds to the limits for the float process. It is found that the working range for the glass according to this invention is slightly shifted towards the higher temperatures but remains very close to that of glass A; in practice the modifications to be carried out are therefore minima and do not present any particular difficulties. After preparation, the glasses are crushed and placed in acidified water, the conductivity of which is measured with time. The results of these measurements have been plotted in FIG. 1 with the ordinate showing the conductivity value of the water (in microSiemens per cm) and the abscissa showing the time (in minutes). Curves (1) and (2) corresponds, respectively, to glass A and to glass B, without toughening treatment, while curves (3) and (4) correspond to these same glasses after a strengthening by ion exchange (9 days in a potassium nitrate bath at 460° C.). With a non-toughened glass according to this invention, the conductivity increases very slightly, which shows that this glass has a hydrolytic resistance considerably greater than that of the reference glass. After toughening, this hydrolytic resistance remains strong and is relatively low, but nevertheless is much higher than that of the toughened reference glass, although the exchange depths are much greater in the case of the glass according to this invention.

| Treatment temperature | Duration (hours) | Surface stresses (MPa) | Depth (microns) |
| --- | --- | --- | --- |
| 440° C. | 24 | 560–620 | 91 |
| | 72 | 482–498 | 158 |
| | 144 | 425–454 | 223 |
| 460° C. | 24 | 467–481 | 121 |
| | 72 | 400–444 | 210 |
| | 216 | 338–352 | 363 |
| 415° C. | 432 | 503 | 265 |
| 350° C. | 408 | 706–736 | 85 |
| 425° C. | 336 | 450 | 274 |

The above table shows that the composition according to this invention is particularly favourable to ion exchanges in a potassium nitrate bath. For comparison, it may be stated that for the standard A glass, after 48 hours at 440° C a surface compressive stress of 552 MPa is obtained, for an exchanged depth of 27 microns, and after 216 hours at 460° C., a surface compressive stress of 366 MPa for an exchanged depth of 78 microns.

From the above table it is clearly apparent that pane B enables very high compresive stress levels to be obtained for exceptional exchanged depths. The predictable decrease in the breaking strength values is certainly verified progressively as the duration of the treatment increases, but this decrease, due to a commencement of relaxation of the stresses, is not such that it leads to low levels. On the contrary, the final level of the surface compressive stresses is much higher than that achieved with glass A (which itself also relaxes).

Figure 4:
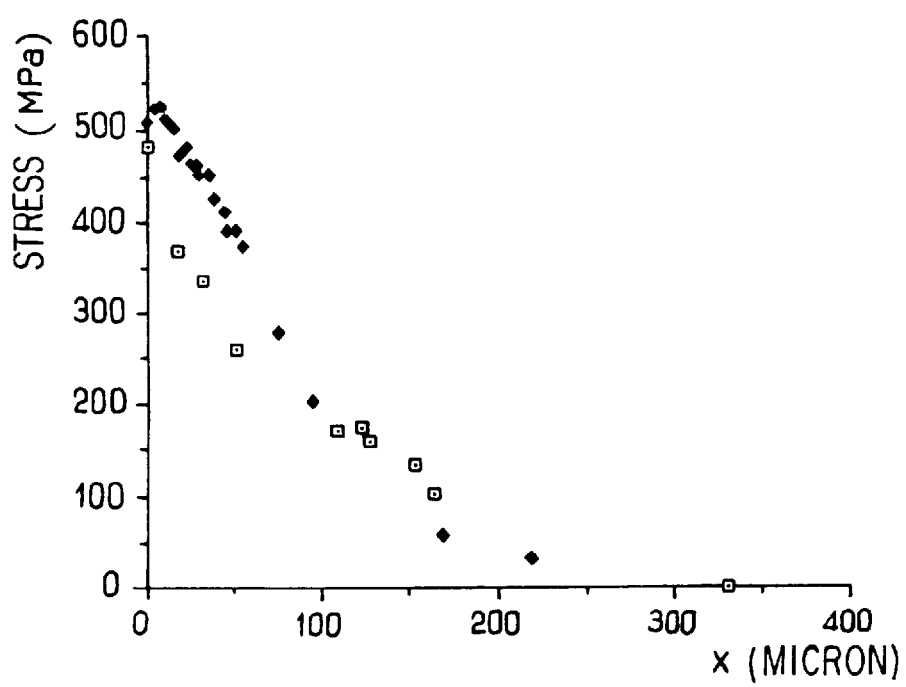

The FIGS. 3 and 4 attached to the present specification illustrate another remarkable aspect of the products according to this invention: the profile of strengthening with depth: the abscissa corresponds to the depth and the ordinate to the compressive stress at the depth considered; the point 0 on the abscissa corresponds therefore to the value of the surface compressive stress.

In FIG. 3 there is shown at 5 the curve obtained with a glass having a composition identical to B, strengthened by a 17 day treatment at 350° C. Curve 6 corresponds to the reference glass A having been subjected to a 20 day treatment at 435° C.—which leads to a total exchanged depth that is substantially the same. The pane according to this invention advantageously has a maximum of compressive stress levels in the immediate vicinity of the surface of the pane whereas, on the contrary, in the case of the reference pane this maximum is reached for the layers at a depth of 10–20 microns. Now it is clear that the loads to which the pane is subjected are essentially external and that it is therefore important to have a very high compressive stress at the surface. On the other hand, it is important to raise the relatively low level of the compressive stresses obtained with the reference glass A.

FIG. 4 establishes another comparison, this time with another glass, the composition of which also lends itself well a reinforcement by chemical means, but with quite a different matrix which implies not the reinforcement of sodium ions by potassium ions but of lithium ions by sodium ions. It is remarkable to note that, even though a different composition of this type enables products to be obtained in which the surface compressive stress and the depth exchanged are of the same order of magnitude as in the case of the inventions the products according to this invention are distinguished by a less steep profile, the decrease in the compressive stress levels observed for the first 50 microns being less rapid.

Moreover, it has been found that the panes according to the invention have, a very high resistance to impact by hard particles of small size, of the grit or chippings type, which can come into impact on the pane during take-off or landing, or in flight in proximity to the ground for helicopters. It should be noted that the impact due, for example, to a chip does not normally affect the windscreen in its entire integrity (as may be the case, for example, with impact with a bird in flight), but can lead to cracks which, although they do not lead to complete ruination of the pane, certainly require its replacement.

To estimate the resistance to flying chips, test specimens are placed perpendicularly to the axis of shooting a steel ball of 1.6 mm diameter and mass 16.2 mg. The shooting device is such that it enables the speed of impact of the projectile to be modulated. When the shot has been fired, the breaking strength after impact is measured, starting from a 4-point bending test.

For relatively slow impact speeds, the rupture of the pane is due to a break close to the edges and takes place for a failure stress level that is substantially constant, whatever the speed of impact. In contrast, beyond a certain speed, known as the transition speed, the breakage is observed in the vicinity of the point of impact and, in particular, is produced for very low stress levels, for example less than 50 MPa. FIG. 2 shows the typical form of the curve representing the value of the failure stress in bending as a function of the impact speed of the ball. In the case of a glass A or B, not reinforced, the transition speed is in the region of 15 m/sec. After chemical toughening, this transition speed is of the order of 45 m/sec for glass A and of 70 m/sec for glass B according to this invention. The panes according to this invention find an application, more particularly, in the composite panes such as aircraft windscreens and, more generally, in all the aeronautical applications or, in addition, in all the usual applications of toughened glasses, and notably those for automobile panes, bulletproof panes, or railway panes. They may also be used for the production of digital optical discs, an application in which there is required, simultaneously, very high mechanical strength and very good planeity.

We claim:

1. A glass pane, comprising a matrix, wherein at least 96% by weight of said matrix comprises, in percentage by weight:

65.0–76.0% $SiO_2$;

1.5–5.0% $Al_2O_3$;

4.0–8.0% MgO;

0.0–4.5% CaO;

10.0–18.0% $Na_2O$;

1.0–7.5% $K_2O$; and 0.0–4.0% $B_2O_3$;

wherein the amount of each component, in percentages by weight, satisfies $0<(CaO)/(CaO+Mgo)<0.45$ and $0.05<(K_2O)/(Na_2O+K_2O)<0.35$, and said glass pane has been toughened by surface ion exchange for a duration of at least 72 hours.

2. A glass Pane according to claim 1, wherein the boron oxide content of the matrix exceeds 2%.

3. A glass pane according to claim 2, characterized in that the matrix comprising in percentages by weight:

$SiO_2$:65.70%

$Al_2O_3$:4.59%

MgO:6.89%

Na$_2$O:12.20%

K$_2$O:6.16%

B$_2$O$_3$:3.44%.

4. A glass pane according to claim 1. wherein said glass pane is produced by a casting float process on a bath of molten tin.

5. A method of making the glass pane of claim 1 comprising treating float glass by potassium ion exchange for a period of at least 72 hours, at a temperature of from 350° C. to 475° C.

6. A glass pane produced by the process of claim 5.

7. A glass pane according to claim 11, wherein said glass pane is a laminated composite pane.

8. The glass pane of claim 1, wherein said glass pane has a tin oxide content of 1–5 wt. % integrated over the first 10 microns from a surface of said glass pane.

9. The glass pane of claim 1 wherein said glass pane has been toughened by surface ion exchange for a duration of at least 10 days.

10. A glass pane, having a surface ion exchange depth of at least 200 microns, and having a surface compressive stress of at least 400 MPa.

11. The glass pane of claim 10 wherein at least 96% by weight of said glass pane comprises, in percentages by weight:

65.0–76.0% SiO;

1.5–5.0% Al$_2$O$_3$;

4.0–8.0% MgO;

0.0–4.5% CaO;

10.0–18.0% Na$_2$O;

1.0–7.5% K$_2$O; and 0.0–4.0% B$_2$O$_3$;

wherein the amount of each component, in percentages by weight, satisfies 0<(CaO)/(CaO+MgO)<0.45 and 0.05< (K$_2$O)/(Na$_2$O+K$_2$O)<0.35.

12. The glass pane of claim 10 wherein said glass pane has a tin oxide content of 1–5 wt. % integrated over the first 10 microns from a surface of said glass pane.

13. The glass pane of claim 10 wherein said glass pane has a surface compressive stress of at least 500 MPa.

14. A glass pane, having a surface ion exchange depth of at least 50 microns, and a surface compressive stress of at least 700 MPa.

15. The glass pane of claim 14, wherein at least 96% by weight of said glass pane comprises, in percentages by weight:

65.0–76.0% SiO$_2$;

1.5–5.0% Al$_2$O$_3$;

4.0–8.0% MgO;

0.0–4.5% CaO;

10.0–18.0% Na$_2$O;

1.0–7.5% K$_2$O; and 0.0–4.0% B$_2$O$_3$;

wherein the amount of each component, in percentages by weight, satisfies 0<(CaO)/(CaO+MgO)<0.45 and 0.05< (K$_2$O)/(Na$_2$O+K$_2$O)<0.35.

16. The glass pane of claim 14, wherein said glass pane has a tin oxide content of 1–5 wt. % integrated over the first 10 microns from a surface of said glass pane.

17. The glass pane of claim 14, wherein said glass pane has a surface ion exchange depth of at least 85 microns, and a surface compressive stress of at least 706 MPa.

* * * * *